US008002988B2

(12) United States Patent
Somasundaran et al.

(10) Patent No.: US 8,002,988 B2
(45) Date of Patent: Aug. 23, 2011

(54) REMOVAL OF CONTAMINANTS FROM WATER USING SUGAR BASED SURFACTANT ENHANCED ULTRAFILTRATION

(75) Inventors: Ponisseril Somasundaran, Nyack, NY (US); Shaohua Lu, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 250 days.

(21) Appl. No.: 12/150,446

(22) Filed: Apr. 28, 2008

(65) Prior Publication Data
US 2008/0308495 A1    Dec. 18, 2008

Related U.S. Application Data

(60) Provisional application No. 60/926,274, filed on Apr. 26, 2007.

(51) Int. Cl.
*B01D 15/00* (2006.01)
*B01D 24/00* (2006.01)
(52) U.S. Cl. ........................................................ 210/639
(58) Field of Classification Search .................. 210/639
See application file for complete search history.

(56) References Cited

U.S. PATENT DOCUMENTS
2006/0021938 A1* 2/2006 Diallo .......................... 210/638

OTHER PUBLICATIONS

Adamczak et al., Ultrafiltration of Micellar Solutions Containing Phenols, 1999, Journal of Colloid and Interface Science, 218, 359-368.*
Zhang et al., Journal of Colloid and Interface Science, 256, 16-22, 2002.*

* cited by examiner

*Primary Examiner* — Krishnan S Menon
*Assistant Examiner* — Allison Gionta
(74) *Attorney, Agent, or Firm* — Schwegman, Lundberg & Woessner, P.A.

(57) ABSTRACT

Embodiments of the present invention relate to the removal of contaminants from water using sugar based surfactant enhanced ultrafiltration.

Embodiments of the present invention are directed to a process for removal of an at least slightly water-soluble organic compound from an organic-contaminated water solution to provide a purified water solution, including: adding a surfactant to the organic-contaminated water solution in sufficient quantity to achieve at least a critical micellar concentration of the surfactant in the organic-contaminated water solution, wherein the surfactant comprises an alkylglycoside, to provide a micellar water solution comprising micelles comprising the surfactant and the organic compound; contacting an ultrafiltration membrane with the micellar water solution under pressure and temperature conditions sufficient for liquid flow through the ultrafiltration membrane to take place; and collecting liquid permeating the ultrafiltration membrane to provide the purified water solution.

10 Claims, 8 Drawing Sheets

REMOVAL OF CONTAMINANTS FROM WATER USING SUGAR BASED SURFACTANT ENHANCED ULTRAFILTRATION

PRIORITY OF INVENTION

This non-provisional application claims the benefit of priority under 35 U.S.C. §119(e) to U.S. Provisional Patent Application Ser. No. 60/926,274, filed Apr. 26, 2007, which is herein incorporated by reference.

BACKGROUND

The use of surfactants in micellar enhanced ultrafiltration (MEUF) has attracted considerable attention since Dunn et al[1,2] first named the process and demonstrated the technique by recovering 4-tert-butylphenol from aqueous solutions. With the increase in public concern about environmental pollution and energy consumption, the classical separation techniques are becoming insufficient to meet strict environmental requirements. Since the toxic organic molecules that become associated with surfactant micelles have been found to be more effectively prevented from passing through the pores in membranes in the MEUF process (i.e., retained by the membrane) than the molecules not included in micelles, surfactants have been used effectively for enhancing the removal of organic contaminants from aqueous solutions.[3]

The performance of various surfactants for removal of phenols from aqueous solutions in the MEUF process has been studied. Using phenol as a model compound in these studies, the effectiveness of surfactants is often represented as the rejection ratio of the phenol,[4] defined as the percentage of phenol that is retained by the membrane in the retentate as shown in the equation below.

$$R = \left(1 - \frac{[P]_m}{[P]}\right) \times 100\% \quad (1)$$

where "P" stands for phenol and the subscript "m" stands for micellar phase.

Cationic surfactants have been studied most intensively because of their positive charge, which attracts ionized phenol molecules (phenolates) electrostatically. Alkyl trimethylammonium salts[2-10] and cetylpyridinium chloride (CPC)[11-14] have been reported to have high effectiveness for removal of phenol from aqueous solutions. The rejection ratio of phenol in an MEUF process containing cationic surfactant micelles increases dramatically with pH. For comparison, anionic sodium dodecyl benzene sulfonate[3] and sodium dodecyl sulfates[4,5,7,9,11,15] were also studied; relatively low rejection ratios were reported, and the rejection ratio of phenol was observed to decrease with pH.

A drawback of MEUF is that monomeric surfactant molecules not retained by the membranes can recontaminate the otherwise purified permeate water. The monomer concentration is mainly determined by the critical micellar concentration (CMC) of the surfactant used. Generally, ionic surfactants have a higher CMC than do nonionic surfactants due to electrostatic repulsion; therefore, nonionic surfactants are preferred in terms of minimizing recontamination. Nonionic nonyl phenol ethoxylates[3,16], polyoxyethyleneglycol alkylether[17,18] and alkyl polyglucoside[4] have been studied. The performances of these nonionic surfactants have shown the least dependence on pH compared with cationic and anionic species. In addition, block copolymer has also been studied for MEUF, and the rejection ratio of phenol has been reported to be approximately 75%[19]. Since the rejection ratio of phenol depends on the concentration and the composition, an equilibrium constant[11] has been defined in order to compare the performances of various surfactants.

$$K_{eq} = \frac{[P]_m}{[P]_a([S] - cmc)} \quad (2)$$

where "S" stands for surfactant. The subscript "a" stand for aqueous phase. "[S]-cmc" is the concentration of the surfactant which contributes to the surfactant micelles.

Most of the studies of MEUF focus on the flux of permeate and the rejection ratio of phenols under various conditions. However, the mechanism of the association of phenol with surfactant micelles remains unclear. The interactions between surfactants and phenols, the distribution of phenols in aqueous and micellar phases, and the effects of phenols on the surfactant micellization are not fully understood.

Ultrafiltration techniques has also been used for separation of surfactant monomers from micelles for understanding of the micellization behaviors of surfactants[20-25]. In the ultrafiltration process, surfactant micelles are retained in the bulk solution (retentate), while solvent molecules and surfactant monomers pass through the pores in the membrane (permeate). By measuring the surfactant concentration in the permeate, the concentration of surfactant monomers is determined and related to the micellization behavior of the surfactant molecules. Huang, et al,[23] have reported abnormal changes in monomer concentration using ultrafiltration and suggested coexistence of different micelle species.

When phenol solubilizes in micelles, it may affect the size and shape of the micelles. It has been reported[10] that phenol solubilizes in the palisade layer and not in the micellar core, and the hydrophilic heads of surfactants also affect the solubilization of phenol. Kim et al[17] have reported a decrease in rejection of phenol in response to an increase in the number of oxyethylene groups in the surfactant polyoxyethyleneglycol alkylether $C_nE_m$, which suggests that hydrophobicity of the surfactant is favored for the solubilization of phenol.

REFERENCES (1) Dunn, R. O. Jr; Scamehorn, J. F.; Christian, S. D. Sep. Sci. Tech. 1985, 20(4), 257-84.
(2) Dunn, R. O. Jr; Scamehorn, J. F.; Christian, S. D. Sep. Sci. Tech. 1987, 22(2-3), 763-89.
(3) Kandori, K.; Schechter, R.; Sep. Sci. Tech. 1990, 25 (1-2), 83-108.
(4) Adamczak, H.; Materna, K.; Urbanski, R.; Szymanowski, J., J. Colloid Interface Sci. 1999, 218, 359-368.
(5) Materna, K.; Goralska, E.; Sobczynska, A.; Szymanowski, J. Green Chem., 2004, 6, 176-182.
(6) Korzystka, B.; Adamczak, H.; Sobczynska, A.; Szymanowski, J. Colloids and Surfaces A: Physicochem. Eng. Aspects, 2003, 212, 175-183.
(7) Urbanski, R.; Goralska, E.; Bart, H. J.; Szymanowski, J., J. Colloid Interface Sci. 2002, 253, 419-426.
(8) Bielska, M.; Szymanowski, J., J. Mem. Sci. 2004, 243, 273-281.
(9) Talens-Alesson, F. I.; Urbanski, R.; Szymanowski, J., Colloids and Surfaces A: Physicochem. Eng. Aspects, 2001, 178, 71-77.
(10) Kandori, K.; McCreevy, R. J.; Schechte, R. S., J. Phys. Chem. 1989, 93, 1506-1510

(11) Sabate, J.; Pujola, M.; Centelles, E.; Galan, E.; Llorens, J.; Colloids and Surfaces A: Physicochem. Eng. Aspects 1999, 150, 229-245.
(12) Sabate, J.; Pujol, M.; Llorensy, J., J. Colloid Interface Sci. 2002, 246, 157-163.
(13) Syamal, M.; De, S.; Bhattacharya, R. K.; J. Mem. Sci. 1997, 137, 99-107.
(14) Jadhav, S. R.; Verma, N.; Sharma, A.; Bhattacharya, P. K.; Separation and purification technology 2000, 24, 541-557.
(15) Tung, C.; Yang, Y.; Chang, C.; Maa, J.; Waste management 2002, 22, 695-701.
(16) Kandori, K.; Mcgreevy, R. J.; Schechter, R. S.; J. Colloid Interface Sci. 1989, 132(2), 395-402.
(17) Kim, J.; Kim, C.; Separation science and technology, 2003, 38(8), 1791-1811.
(18) Talens-Alesson, F. I.; Adamczak, H.; Szymanowski, J.; J. Mem. Sci. 2001, 192, 155-163.
(19) Choi, Y.; Lee, S.; Lee, D.; Ishigami, Y.; Kajiuchi, T.; J. Mem. Sci. 1998, 148, 185-194.
(20) Asakawa, T.; Johten, K.; Miyagishi, S.; Nishida, M.; Langmuir 1988, 4, 136-140.
(21) Warr, G. G.; Grieser, F.; Healy, T. W.; J. Phys. Chem. 1983, 87, 1220-1223.
(22) Makayssi, A.; Lemordant, D.; Treiner, C. Langmuir 1993, 9, 2808-2813.
(23) Huang, Lei.; Somasundaran, P. Langmuir 1996, 12, 5790-5795.
(24) Osborne-Lee, I. W.; Schechter, R. S.; Wade, W. H. J. Colloid Interface Sci. 1983, 94, 179-186.
(25) Mizoguchi, K.; Fukui, K.; J. Mem. Sci 2002, 208, 285-288.
(26) Zhang, L.; Somasundaran, P.; Maltesh, C.; Langmuir 1996, 12(10), 2371-2373.
(27) Scamehorn, J. F.; Harwell, J. H.; Sch. Chem. Eng. Mater. Sci., Surfactant Science Series 26, 169-85.
(28) Agarwal V.; Colloids and Surfaces A: Physicochem. Eng. Aspects 2006, 281, 246-253.
(29) Borgias, B. A.; Gochin, M.; Kerwood, D. J.; James, T. L., Prog. NMR Spectroscopy, 1990, 22, 83.
(30) Macura, S.; Ernst, R. R; Mol. Phys. 1980, 41, 95.
(31) Yang, Q.; Zhou, Q.; Somasundaran, P.; Submitted to J. Colloid and Interface Sci.
(32) Chattopadhyay, K.; Das, T. K.; Majumadar, A.; Mazumdar, S., Journal of Inorganic Biochemistry 2002, 91, 116-124
(33) Dupuy, C.; Langmuir 1997, 13, 3965-3967.

SUMMARY

Embodiments of the present invention relate to the removal of contaminants from water using sugar based surfactant enhanced ultrafiltration.

Embodiments of the present invention are directed to a process for removal of an at least slightly water-soluble organic compound from an organic-contaminated water solution to provide a purified water solution, including: adding a surfactant to the organic-contaminated water solution in sufficient quantity to achieve at least a critical micellar concentration of the surfactant in the organic-contaminated water solution, wherein the surfactant comprises an alkylglycoside, to provide a micellar water solution comprising micelles comprising the surfactant and the organic compound; contacting an ultrafiltration membrane with the micellar water solution under pressure and temperature conditions sufficient for liquid flow through the ultrafiltration membrane to take place; and collecting liquid permeating the ultrafiltration membrane to provide the purified water solution.

The surfactant used in the inventive process may include an alkyl glycoside surfactant, such as n-dodecyl-β-D-maltoside (DM), a sugar-based material that is both non-toxic and biodegradable. It can also be synthesized from naturally renewable resources[26]. DM, and other alkyl glycoside surfactants, have high interfacial activity with a very low critical micellar concentration (CMC) value (0.18 mM for DM), which assists in keeping the surfactant concentration at a low level in the MEUF permeate. In addition, alkyl glycoside surfactants, such as DM, also show high tolerance to electrolytes, which may extend their practical application to purification of solutions with high salinity.

DETAILED DESCRIPTION OF THE INVENTION

Definitions

Figure 1:
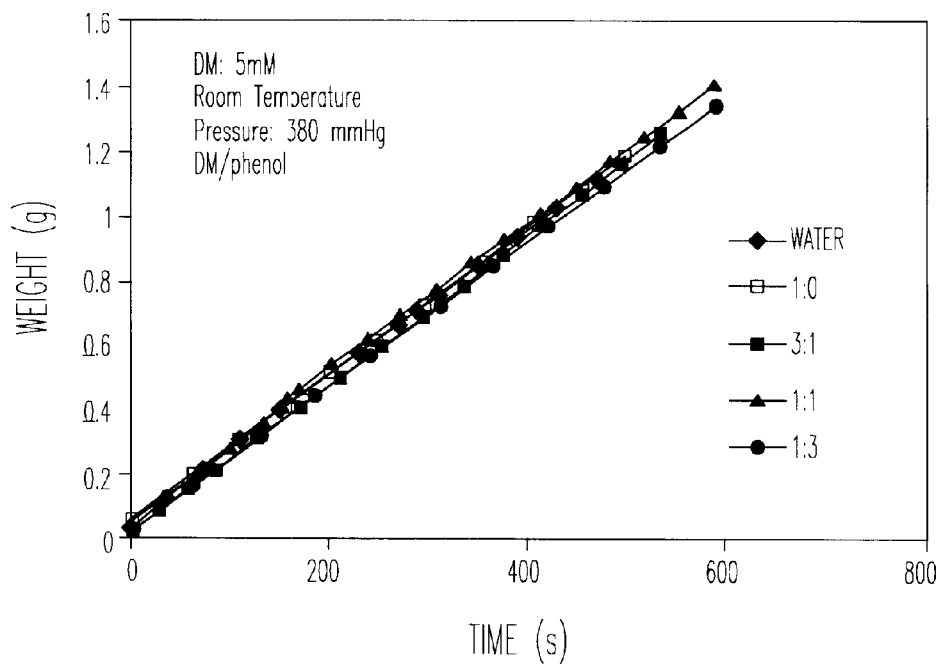
FIG. 1 is a graph of ultrafiltration results for DM/phenol solutions with dodecyl maltoside concentration 5 mM and various mixing ratios

As used herein, "organic compound" refers to a compound composed of carbon and other elements including hydrogen, oxygen, nitrogen, sulfur, phosphorus, and halogens. Halogens include fluorine, chlorine, bromine and iodine.

As used herein, "a phenol" or a member of the "class of phenols" refer to a compound including a hydroxyaryl moiety. An example of a phenol is a cresol, that is, a hydroxytoluene.

As used herein, "phenol" refers to hydroxybenzene.

As used herein, a "surfactant" is a compound, often organic, that has the property of reducing interfacial surface tension between water and water-insoluble liquids or surfaces; to reduce the surface tension of water; or to promote formation of micelles or emulsions. A surfactant typically includes a hydrophilic region and a hydrophobic region. A micelle is a macromolecular complex including a plurality of surfactant molecules in water wherein the hydrophobic regions of the molecules associate with each other and the hydrophilic regions form a hydrated interface with bulk water. A micelle can form a complex or association with other organic molecules, for example, with phenols.

As used herein, a "glycoside" is an organic compound including a sugar or carbohydrate moiety covalently bonded to another moiety such as an alkyl or aryl group, typically through the oxygen atom bonded to the anomeric carbon atom. Alkyl groups include straight chain and branched alkyl groups and cycloalkyl groups having from 1 to about 20 carbon atoms, and typically from 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, isobutyl, sec-butyl, t-butyl, neopentyl, isopentyl, and 2,2-dimethylpropyl groups.

As used herein, "ultrafiltration" refers to a process wherein a liquid is placed in contact, typically under some head of pressure, with a semipermeable membrane containing pores of a specified size, such that molecules or complexes small enough to pass through the pores permeate the membrane to the opposite side, whereas molecules or complexes too large to pass through the pores are retaining on the upstream side of the membrane. Ultrafiltration membranes are typically formed from polymers and are specified to have a particular cutoff molecular weight.

DETAILED DESCRIPTION

Embodiments of the inventive process may provide an improved method for removal of organic contaminants such as phenols, including phenol itself, from water-based waste streams or contaminated sources. Formation of micelles using the biodegradable surfactant comprising an alkyl glycoside provides for more efficient retention of the contaminant by the ultrafiltration membrane, and the benign properties of the surfactant helps assure that any small amount of surfactant that permeates the membrane is minimally polluting to the otherwise purified permeate stream.

Figure 8:
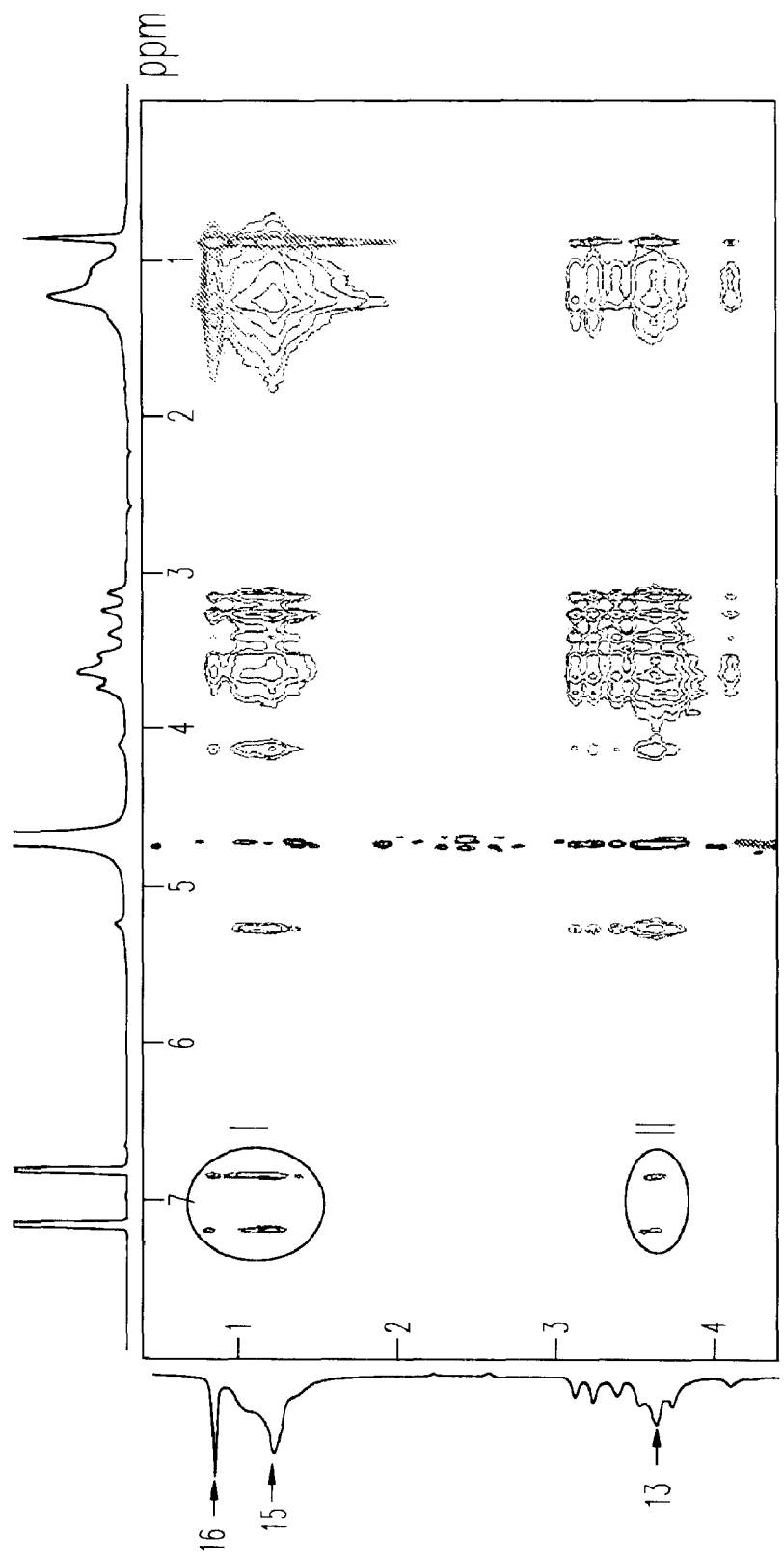
FIG. 8 shows contour plots of the 2D NOESY map of DM and phenol mixture, according to some embodiments of the disclosed subject matter. Areas circled by dashed lines indicatin the crossing over peaks between DM and Phenol.

The present invention provides a process for removal of an at least slightly water-soluble organic compound from an organic-contaminated water solution to provide a purified water solution, including: adding a surfactant to the organic-contaminated water solution in sufficient quantity to achieve at least a critical micellar concentration of the surfactant in the organic-contaminated water solution, wherein the surfactant comprises an alkylglycoside, to provide a micellar water solution comprising micelles comprising the surfactant and the organic compound; then, contacting an ultrafiltration membrane with the micellar water solution under pressure and temperature conditions sufficient for liquid flow through the ultrafiltration membrane to take place; and then, collecting liquid permeating the ultrafiltration membrane to provide the purified water solution. The contaminating organic compound can be a neutral organic compound. The contaminating organic compound can be of the class of phenols, which class of compound is generally at least slightly soluble in water even when not ionized. The compound of the class of phenols can be phenol, hydroxybenzene, itself, a common industrial material that is difficult to remove from wastewater streams. Other phenols include cresols, which are common contaminants of groundwater due to creosote-treated wood being present in the environment. Addition of a surfactant including an alkylglycoside, such that the resulting concentration is at or above the critical micellar concentration, results in formation of micelles incorporating the phenol. These micelles are more readily retained by ultrafiltration membranes, and therefore less phenol bleeds through the membrane into the permeate stream. Thus, as illustrated in FIG. 8, an embodiment of the inventive process first creates micelles containing the surfactant and the organic contaminant in the contaminated water solution by addition of the surfactant to the wastewater solution, then, by ultrafiltration, separates the micelles containing the organic contaminant, which remain in the retentate, i.e., do not pass through the ultrafiltration membrane, from the bulk water which is the permeate, i.e., passes through the ultrafiltration membrane. The permeate may contain traces of monomer surfactant; however, due to the benign, biodegradable character of the surfactant used in the inventive process, the presence of this trace contaminant is minimally significant from the environmental perspective. The micellar water solution may have a surfactant concentration of about 5-50 mM, about 10-40 mM or about 20-30 mM, for example.

The interaction between n-dodecyl-β-D-maltoside and phenol was examined by means of ultrafiltration, 2-D NMR and Cryo-TEM experiments. In ultrafiltration, it has been found that both surfactant concentration and phenol concentration affect the flux of ultrafiltration and the rejection of phenol depends on the surfactant/phenol ratio and phenol concentration. It has been found that phenol molecules solubilize in the palisade layer of DM micelle with benzene ring interacting with the alkyl chain of DM molecules. The solubilization of phenol molecules causes swelling of DM micelles as demonstrated by Cryo-TEM.

The selection of surfactant for MEUF process is usually determined by performance of the surfactant including flux and rejection ratio. In the test, the permeate of solutions containing surfactant and phenol was recorded with time to obtain the flux.

1) Ultrafiltration Flux

The flux of solutions containing surfactants and phenol, J, in the ultrafiltration process depends on the characteristics of the membrane, properties of fluid (mainly viscosity) and the overpressure applied. The relationship is represented as [9].

$$J = K \frac{\Delta P}{\eta} \quad (3)$$

where K is the membrane constant, ρ is the viscosity of the solution and ΔP is the—pressure difference across the membrane.

Since all the tests were done at constant overpressure using the same type of membrane, the only variable affecting the flux is the composition of the solution. Generally, the viscosity of the solutions increases with the concentrations of surfactant and phenol. Thus, the MEUF flux decreases with the concentration.

To understand the effects of solution composition on MEUF of phenol, tests were conducted at 5 mM, 25 mM and 50 mM n-dodecyl-β-D-maltoside concentrations at DM/phenol ratios 1:0, 3:1, 1:1 and 1:3. The results are plotted as permeate weight vs time in FIGS. 1, 2, and 3.

As is shown in FIG. 1, excellent linear relationship between the permeate weight and time is observed in the time range tested for water and cases of 5 mM DM concentration with slopes slightly decreasing with phenol contents. The fluxes of the solutions were obtained from the slopes with a membrane area of 0.002 m². The flux for water is determined as $1.24 \times 10^{-6}$ m/s, which is close to the literature value[25] under similar conditions (YM-1 membrane, 0.5 MPa pressure, flux 50 l/m²·h=$1.39 \times 10^{-6}$ m/s). The flux for solutions decreases from $1.24 \times 10^{-6}$ m/s to $1.17 \times 10^{-6}$ m/s.

Figure 2:
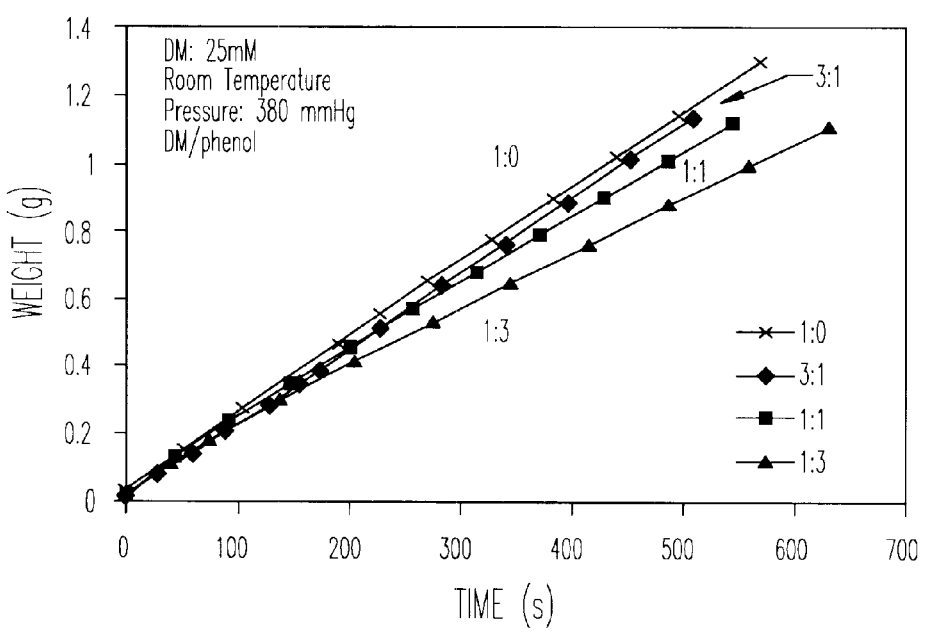
FIG. 2 is a graph of filtered volumes as a function of time for surfactant/phenol solutions with various ratios and fixed dodecyl maltoside concentration 25 mM.

The MEUF results at 25 mM DM concentration are shown in FIG. 2. The concentration of phenol shows a marked effect on the flux, which decreases from $1.18 \times 10^{-6}$ to $0.92 \times 10^{-6}$ m/s with increase in DM/phenol ratio from 1:0 to 1:3.

Figure 3:
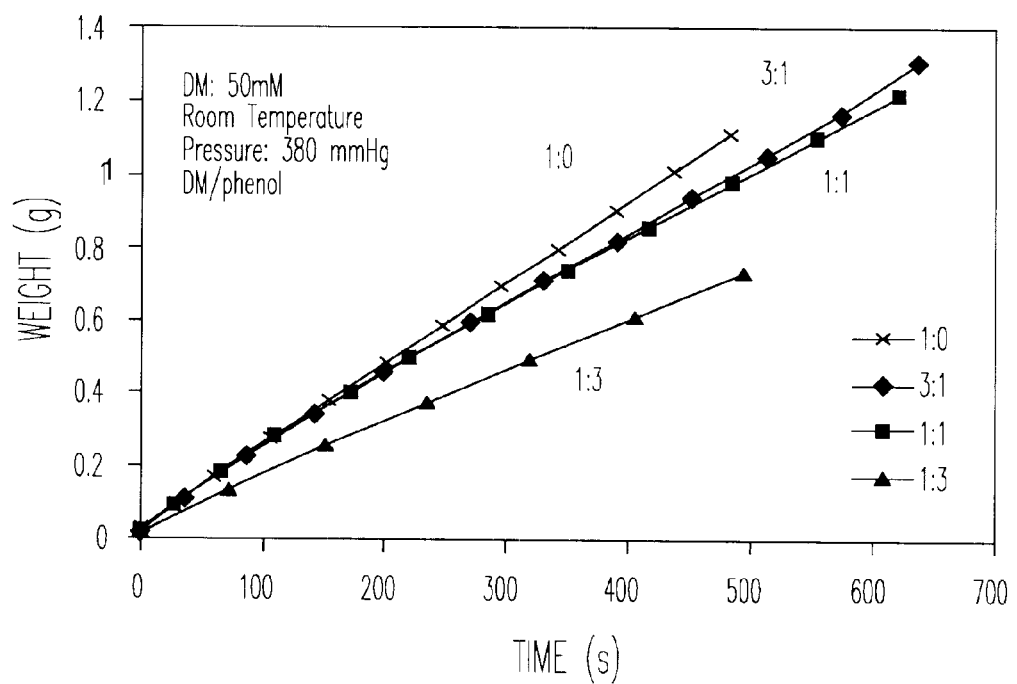
FIG. 3 is a graph of filtered volumes as a function of time for surfactant/phenol solutions with various ratios and fixed dodecyl maltoside concentration 50 mM.
Figure 4:
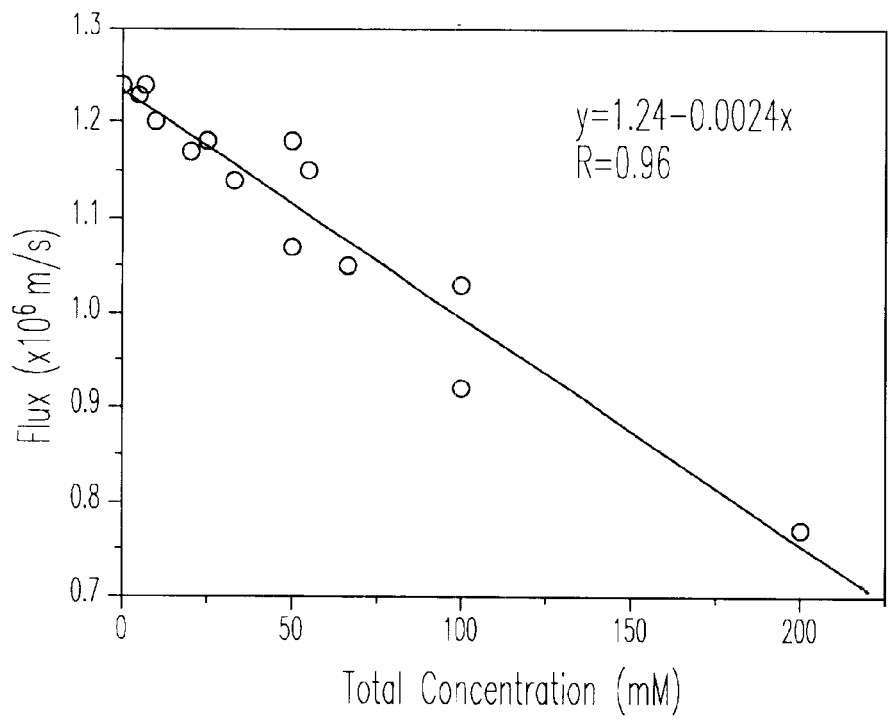
FIG. 4 is a graph showing the flux of MEUF for DM/phenol as a function of total concentration.

The permeate weigh for 50 mM DM solutions are shown in FIG. 3 with a decrease in the slope with an increase in phenol concentration. The flux decreases from $1.18 \times 10^{-6}$ m/s to $0.77 \times 10^{-6}$ m/s with ratios 1:0 to 1:3.

On the other hand, linear relationship between permeate weight and time is observed only for some initial period in cases of 25 mM and 50 mM DM concentration. The slope decreases slightly with time, suggesting a decrease in the flux, which has been attributed to a secondary resistance[7] caused by the deposit of surfactant on the membrane surface and thus a decrease in the effective surface area. Another possible reason is the increase of phenol and surfactant concentrations with time, because the concentrations in retentate increases when permeate containing only monomeric molecules is filtered through the membranes.

Assuming that monomeric concentration of the surfactant remains at its cmc value in the tested concentration range, the surfactant concentration in the retentate can be described below:

$$[S]_R = \frac{[S]_0 - cmc \times V_P/V_0}{1 - V_P/V_0} \quad (4)$$

where S denotes the surfactant, cmc stands for the critical micelle concentration of the surfactant and the subscripts P, R and 0 stand for the permeate, retentate and initial condition, respectively.

According to the above equation, the concentration of retentate increases no more than 10% in the concentration range of 25~300 times cmc, when 10% of the solution is filtered as permeate. Simultaneously, the phenol concentration in retentate will also increase, if phenol prefers to stay in surfactant micelles, and the phenol concentration in retentate can be described in a similar relationship, $$[A]_R = \frac{[A]_0 - M_A \times V_P/V_0}{1 - V_P/V_0} \quad (5)$$

where A denotes the phenol and M stands for the monomer concentration, respectively. The change of phenol concentration in retentate depends mainly on the monomer concentration of phenol in the bulk.

As summarized in Table 1, the flux decreases with both DM and phenol concentrations. Firstly, the viscosity of the solutions increases with the solute concentration. Secondly, the deposition of mixed DM/phenol micelles may occur on the membrane surface at high concentrations, causing a secondary resistance[4]. In addition, in the presence of phenol, the DM micelles can undergo transitions from spherical to worm-like micelles (discussed in next section). The shape change of micelles may cause increase in viscosity and the secondary resistance.

TABLE 1

Flux of ultrafiltration at various surfactant/phenol ratio (×106 m/s)

| | Water 1.24 | | | |
|---|---|---|---|---|
| | DM/phenol 1:0 | DM/phenol 3:1 | DM/phenol 1:1 | DM/phenol 1:3 |
| DM 5 mM | 1.23 | 1.24 | 1.20 | 1.17 |
| DM 25 mM | 1.18 | 1.14 | 1.07 | 0.92 |
| DM 50 mM | 1.18 | 1.05 | 1.03 | 0.77 |

To understand the quantitative effects of solution composition on the characteristics of MEUF process, the fluxes are plotted as a function of the sum the DM and phenol concentration in graph 4. A linear relationship has been identified with a fitting confidence 0.96. The slope was calculated to be $-2.4 \times 10^{-6}$ m/s/mM and intercept equals to the flux of water. This quantitative relationship is very helpful to predict the flux of MEUF for removal of phenol and may be application to other MEUF systems.

According to equation (3), when overpressure ΔP, viscosity η, and flux J, are given, the membrane constant K, can be determined. Using the data for water, (viscosity, 0.001 Pa·s, overpressure, 0.05 MPa, flux, $1.24 \times 10^{-6}$ m/s), the membrane constant is calculated to be $2.5 \times 10^{-14}$ m. An equation is proposed below to describe the effects of the concentration of solutes.

$$J = K \frac{\Delta P}{\eta_0}(1 - kC) \quad (6)$$

Wherein $\eta_0$ stands for the viscosity of water; k for a concentration constant for certain surfactant/phenol system; and C for the total solute concentration. The concentration constant k for DM/phenol system is determined to be 1.9 M$^{-1}$.

The experimental results have shown that the flux of ultrafiltration is dependent on both operation time and concentration. The effect of operation time is due to the accumulation of surfactant and phenol in retentate. The flux of DM/phenol system is found to be proportional to the sum concentration. A linear relationship is proposed to describe the effect of solution composition. This relationship may be applied to other surfactant/phenol systems.

2) Rejection Ratio of Phenol

The performance of MEUF process is determined not only by the flux but also by the rejection ratio of phenol. The rejection ratio is defined as the percentage of phenol retained in retentate. The rejection ratio depends on the association of phenol molecules to the surfactant micelles. Also the presence of phenol may change the size and shape of the micelles and in turn affect the flux. In order to obtain information on the rejection of phenol and understand the mechanisms involved, composition of micelles containing phenol is needed. The permeate solutions collected in the ultrafiltration tests were analyzed using a colorimetric method and UV absorbance to determine the permeate concentrations of surfactant $[S]_p$, and phenol $[P]_p$ respectively. The composition of DM/phenol micelles can be calculated using mass balance. The rejection ratio R, obtained is listed in table 2.

It has been found that the rejection ratio vary with both DM and phenol concentrations. To obtain the equilibrium constant, $K_{eq}$ using equation (2), a term, binding density, $\Gamma_A$, defined as the molar ratio between phenol and surfactant in the micellar phase is introduced and shown in table 2.

$$\Gamma_A = \frac{[P]_M}{[S]_M} \quad (7)$$

TABLE 2

Monomer concentrations of surfactant and phenol at different bulk

| $[S]_0$ (mM) | $[P]_0$ (mM) | $[S]_p$ (mM) | $[P]_p$ (mM) | R | $\Gamma_A$ |
|---|---|---|---|---|---|
| 5 | 0 | 0.12 | 0 | | |
| 5 | 1.67 | 0.20 | 1.40 | 0.18 | 0.06 |
| 5 | 5 | 0.55 | 4.05 | 0.19 | 0.21 |
| 5 | 15 | 0.19 | 13.4 | 0.36 | 0.32 |
| 25 | 0 | 0.28 | 0 | | |
| 25 | 8.3 | 2.29 | 5.19 | 0.37 | 0.14 |
| 25 | 25 | 0.91 | 14.59 | 0.25 | 0.25 |
| 25 | 75 | 1.24 | 50.13 | 0.33 | 1.05 |
| 50 | 0 | 0.61 | 0 | | |
| 50 | 16.7 | 1.88 | 6.00 | 0.64 | 0.22 |
| 50 | 50 | 2.56 | 28.31 | 0.43 | 0.46 |
| 50 | 150 | 1.80 | 85.93 | 0.43 | 1.33 |

Figure 5:
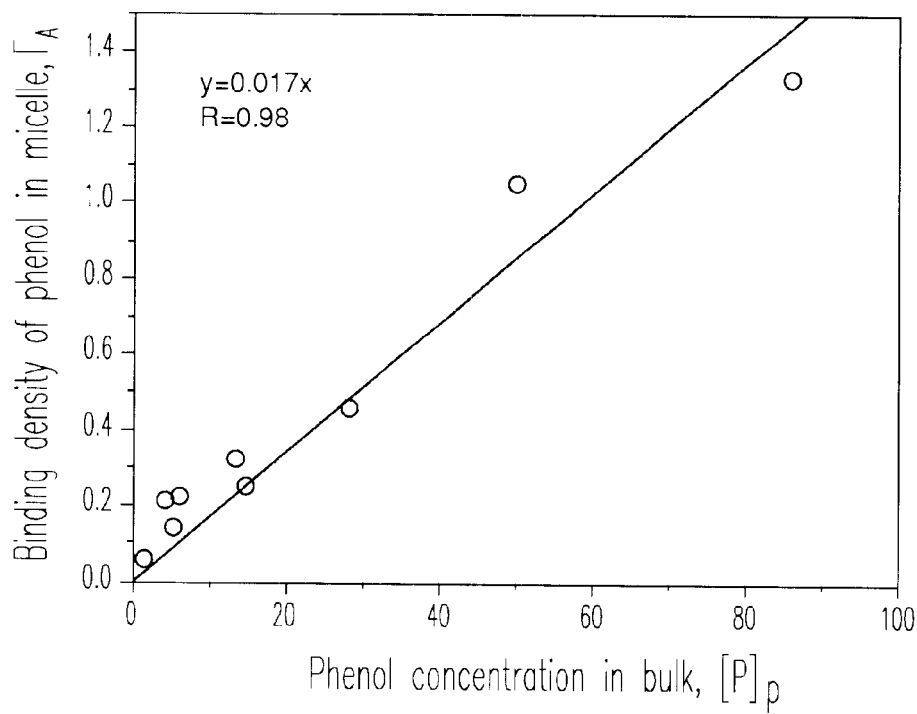
FIG. 5 is a graph showing the binding density of phenol as a function of bulk concentration.

The phenol concentration in permeate $[P]_p$, is assumed to be the phenol monomer concentration. The plot of binding density vs. $[P]_p$ is shown in FIG. 5. The slope was calculated to be 0.017; therefore, the equilibrium constant for n-Dodecyl-β-D-maltoside (see FIG. 6) and phenol system is determined to be 0.017 m $M^{-1}$ or 17 $M^{-1}$, which is higher than that of anionic SDS/phenol, ~0.01 $mM^{-1}$, but lower than those of nonionic C16E20/phenol, ~0.06 $mM^{-1}$ and cationic CPC (cetylpyridinium chloride)/phenol ~0.07 $mM^{-1}$,[11] showing a relative low associative interaction between DM and phenol. With the equilibrium constant, the rejection ratio of phenol can be predicted for various surfactant and phenol systems.

With a pKa 9.92,[5] the concentration of ionized phenol molecules changes significantly with pH; the electrostatic repulsion between phenol molecules reduces the additional association of phenol molecules to surfactant micelles; the equilibrium constant, therefore, decreases with pH and so does the rejection ratio.

To quantify the effects of pH, MEUF tests have been conducted at pH 4, 7 and 10 at DM 25 mM and phenol 25 mM. The results are summarized in table 3. The rejection ratio decreases from 0.37 to 0.14 from pH 4 to pH 10. The equilibrium constant decreases from 23 to 6.5 $M^{-1}$. Firstly, at pH 10, about half of the phenol molecules are in the ionized form, so the electrostatic force between the ionic groups obstacles the association of more phenol molecules. Secondly, ionized phenol molecule has higher affinity to aqueous phase than nonionic phenol, which will cause a decrease of partition of phenol into the micellar phase. As shown in table 2, the binding density of phenol on DM micelles is only 0.14 at pH 10. In other words, there are about 7 surfactant molecules per phenol molecules in the micellar phase. Assuming that the phenol molecules are evenly distributed in the micelles, the distance between two ionized phenol molecules seems to be out of the electrostatic range. Therefore, the latter reason, ionized phenol has high affinity of aqueous phase, may be the main cause for the decrease of equilibrium constant.

In the alkaline pH range, the association between this nonionic surfactant and phenol is weak and the best pH range for removal of phenol using nonionic surfactant should be in acid range.

TABLE 3

Monomer concentrations of surfactant and phenol at different pH

| pH | $[S]_0$ (mM) | $[P]_0$ (mM) | $[S]_p$ (mM) | $[P]_p$ (mM) | R | $\Gamma_A$ | $K_{eq}$ ($M^{-1}$) |
|---|---|---|---|---|---|---|---|
| 4 | 25 | 25 | 0.26 | 15.75 | 0.37 | 0.37 | 23 |
| 7 | 25 | 25 | 0.47 | 18.78 | 0.25 | 0.25 | 13 |
| 10 | 25 | 25 | 0.48 | 21.47 | 0.14 | 0.14 | 6.5 |

3) Molecular Packing in the Micellar Phase

To understand the association mechanism of phenol molecules in the surfactant micelles, information on the position and orientation of phenol molecules is needed. Kandori et al.[10] has reported that the phenol molecules stay in the outer palisade layer of micelles of dodecyltrimethylammonium bromide (DTAB) using ultraviolet absorbance measurements. Based on the Cryo-TEM results of cetyl trimethylammonium bromide (CTAB)/phenol system, Agarwal et al.[28] has speculated that phenol molecules stay in the interfacial layers with the benzene ring interacting with the surfactant hydrocarbon tails and hydroxyl groups interacting with the surrounding water due to its amphiphilic nature, However, direct evidence is lacking to prove the position of phenol molecules.

To investigate the interaction between phenol and DM molecules in micellar phase, 2D NOESY NMR technique was employed for the first time to obtain information on the relative arrangement of DM and phenol molecules. This technique has been used in the past to elucidate the interaction between surfactant molecules in mixed surfactant micelles[29~32] by estimating the distance between pairs of coupled protons from the intensity of the cross-peaks. Such information is helpful for understanding the packing of surfactant molecules in micelles, since the most intense peak suggests the closest proton couple and thus the relative position of molecules.

Figure 7:
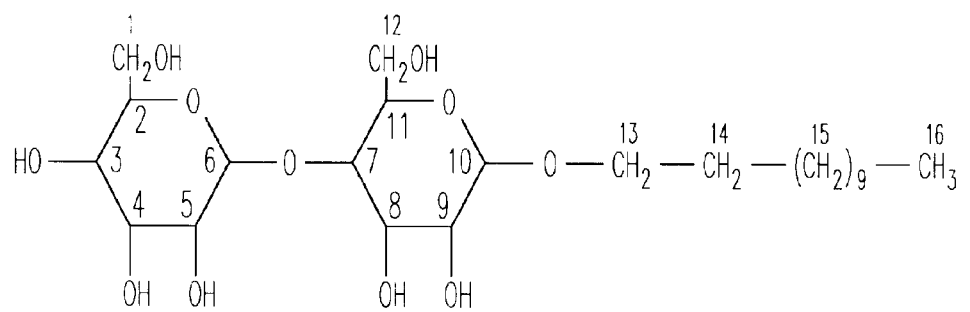
FIG. 7 shows $^1$H NMR proton positions of n-Dodecyl-β-D-maltoside[31,32], according to some embodiments of the disclosed subject matter.

The 1D NMR spectra of phenol have shown that chemical shifts of the protons of phenol molecule are greater than 4.7 ppm; in the contrast, the chemical shifts of the protons of DM molecules are in the sub 4.7 ppm range.[31] This makes it easy to separate the chemical shifts of phenol protons from DM protons. As shown in FIG. 7, the protons of DM molecule are numbered from 1 to 16. The protons of the hydrocarbon tails are numbered from 13 to 16 toward to the end.

As shown on the left axis of FIG. 8, the chemical shift for #16 protons is 0.9 ppm and #14 and 15 protons are between 1.1 to 1.6 ppm. According to the NMR spectrum[31,32] of DM solution, one of the #13 protons has a chemical shift at 3.6 ppm, which corresponds to the peak indicated in FIG. 8. Phenol has two chemical shift peaks at 6.8 and 7.2 ppm.

Figure 9:
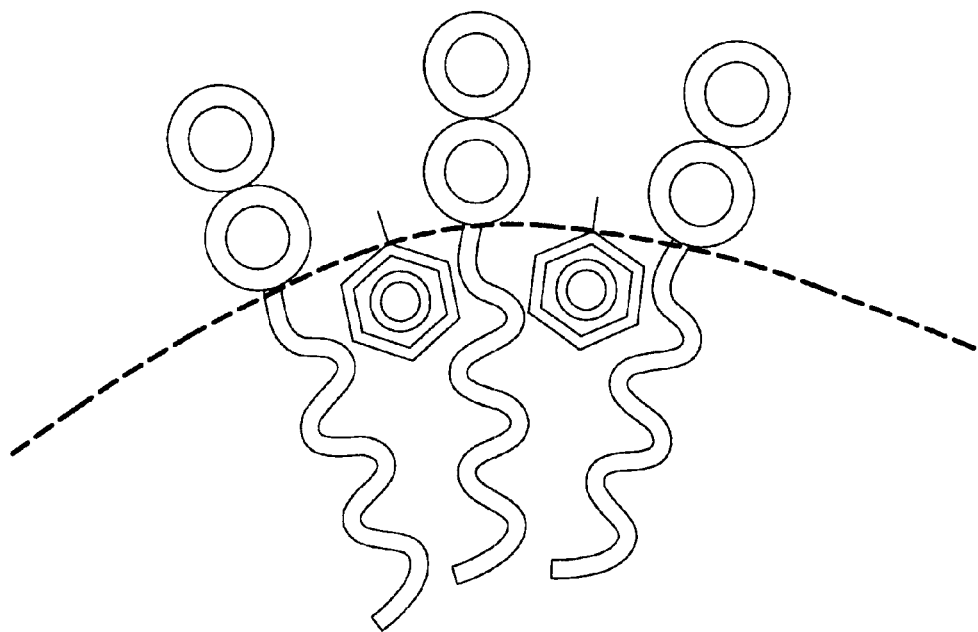
FIG. 9 shows a diagram of phenol molecules in the interfacial layer of the DM miceelles, according to some embodiments of the disclosed subject matter.

As shown in FIG. 8, the intermolecular crossover peaks were identified in range I and range II in the 2D NOESY map of DM/phenol system. In range I, the peaks show the coupled proton pairs between the protons of benzene ring of phenol and #14~16 protons in the hydrocarbon tail of DM. In range II, the peaks are identified as the coupled proton pairs between the protons of benzene ring and one of the #13 protons in the hydrocarbon tail of DM. The results suggest the hydrophobic interaction between the benzene rings and the hydrophobic tails of DM. The results also indicate that phenol molecules stay in the outer layer of the DM micelles. The closeness of the benzene protons to the #13 proton of DM molecule is consistent with the speculation that phenol molecules stay in the outer palisade layer of micelles as shown in FIG. 9.

Figure 10:
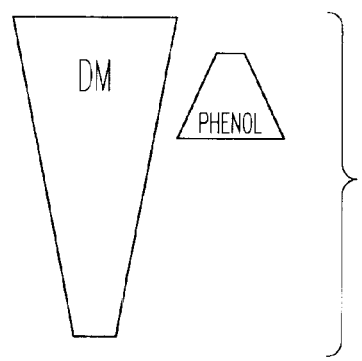
FIG. 10 depicts the packing of n-dodecyl-β-D-maltoside and phenol molecules, according to some embodiments of the disclosed subject matter.

The phenol molecule has a small hydrophilic hydroxyl group and a relatively big hydrophobic benzene ring. Since the phenol molecule stays in the interfacial layer of the micelles, the presence of phenol molecules reduces the curvature of the micelles and in turn the shape of the micelles. The shape of surfactant micelles can be predicted from the packing parameter of the surfactant.[28] The packing parameter of DM is around $0.35$,[33] which suggests a spherical shape. From the definition of packing parameter, $P=v/a_0 l_c$ (v is the volume occupied by the tail group, $a_0$ is the area/head group and $l_c$ the length of the hydrocarbon tail), phenol has a packing parameter greater than 1. As shown in FIG. 10, for the DM micelles containing phenol molecules, the average packing parameter will be greater than that of DM, which suggests the transition of micellar shape from spherical to cylindrical or worm-like depending on the phenol content. It is proposed that the shape of DM micelles will change from spherical to cylindrical due to the presence of phenol.

In conclusion, 2D nosey NMR results revealed the arrangement of the phenol molecules the micellar phase. The phenol molecules reside in the palisade layer of the DM micelles. Based on the geometries of the surfactant and phenol molecules, it is proposed that the shape of the mixed micelles undergoes transition from spherical to cylindrical due to the presence of phenol.

4) Micellar Shape Change

Figure 11:
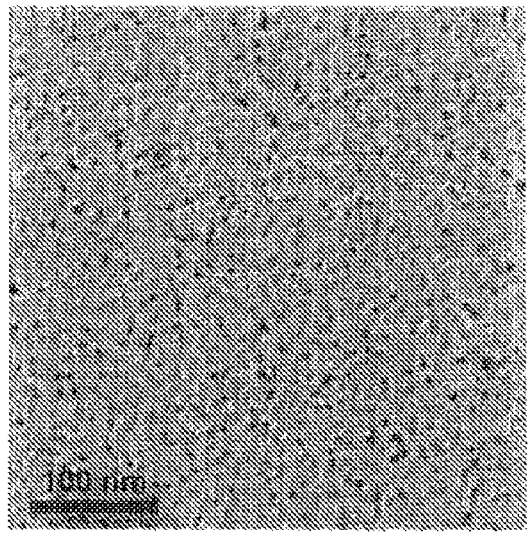
FIG. 11 is a Cryo-TEM micrograph of aqueous solution of 50 mM n-dodecyl-β-D-maltoside —spherical micelles, according to some embodiments of the disclosed subject matter.
Figure 12:
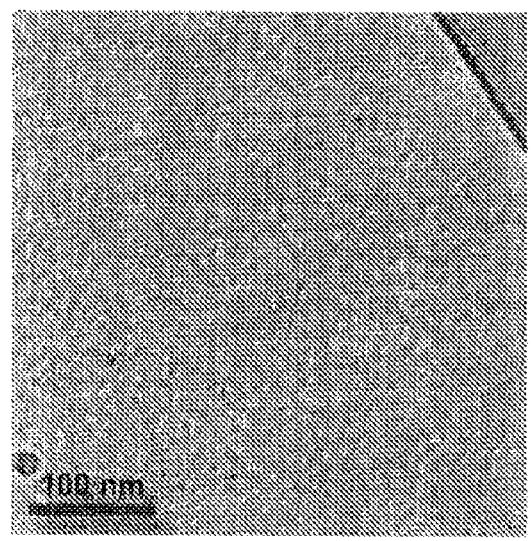
FIG. 12 is a Cryo-TEM micrograph of aqueous solution of 50 mM n-dodecyl-β-D-maltoside and 50 mM phenol— worm-like micelles, according to some embodiments of the disclosed subject matter.

To test the proposal that the transition of micellar shape is due to the presence of phenol, Cryo-TEM technique has been employed, since it is the best for monitoring micellar shapes. Two samples have been tested: solution of 50 mM DM and solution of DM/phenol at 50 mM and 50 mM concentrations. High curvature spherical micelles and low curvature worm-like micelles have been identified for the samples, respectively. FIG. 11 shows the presence of spherical micelles; FIG. 12 shows the existence of worm-like micelles. The results have proven the proposal based on the results of 2D-NMR. Similar shape transitions have been reported 28 for cetyltrimethylammonium bromide/phenol system.

Performance of n-Dodecyl-β-D-Maltoside for Removal of Phenol in MEUF Processes.

Figure 13:
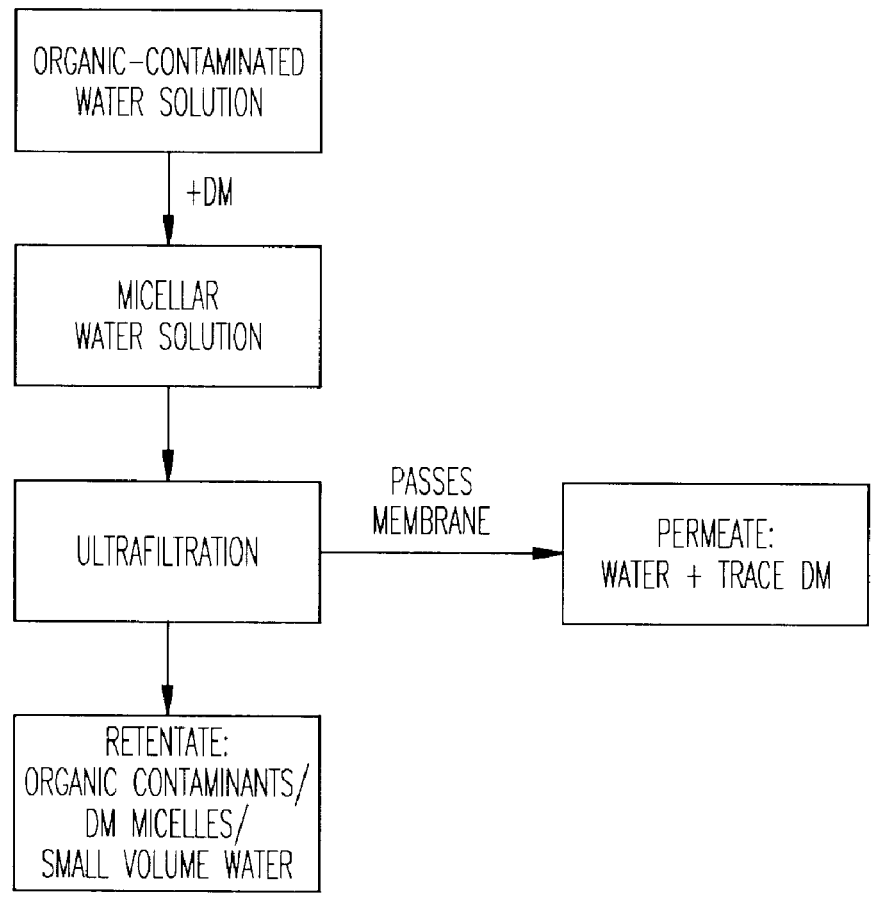
FIG. 13 is a flow diagram of an embodiment of the inventive process, according to some embodiments of the disclosed subject matter.

Sugar based surfactant n-dodecyl-β-D-maltoside has shown ability to remove phenol molecules for ultrafiltration application. See FIG. 13 for a flow diagram of a process of the invention. Two criteria, permeate flux and equilibrium constant, were used to evaluate the performance of n-dodecyl-β-D-maltoside for phenol removal in micellar enhanced ultrafiltration. Permeate flux shows great dependence on the concentration of both DM and phenol. A linear relationship between flux and the sum concentration of DM and phenol has been observed, based on which, an equation is proposed to predict the effects of solute concentration on the permeate flux. The monomeric concentrations of both DM and phenol are obtained by analyzing the composition of permeates. The rejection ratio was shown to be dependent on the concentration of both DM and phenol. Equilibrium constant for DM/phenol has been obtained to be $0.017$ $mM^{-1}$, which indicates relative weak association of phenol to DM micelles compared to the cases of cationic surfactants; however, due to its biodegradability and low CMC, DM should be selected over cationic surfactants.

It has been demonstrated that pH has a dramatic effect on the equilibrium constant of DM/phenol system. The equilibrium constant decreases by about 4 times from pH 4 to pH 10, which suggests low association of phenol molecules to the DM micelles. The effect of pH is mainly due to the higher affinity to aqueous phase of ionized phenols. Acid pH range is suggested to be the best for phenol removal using MEUF technique involving DM.

Packing of Phenol and DM Molecules in Micellar Phase

2D NMR was successfully employed to elucidate the molecular packing in the DM micelles containing phenol. The intermolecular crossover peaks between the coupled protons have revealed the relative position where phenol molecules stay in the micellar phase. It has been shown that phenol molecules stay in the outer layer of DM micelles with benzene rings interacting with the first methane group of the hydrocarbon chain of DM molecule. Based on the 2D NMR spectra and the geometries of DM and phenol molecules, it has been proposed that the presence of phenol in micellar phase reduces the curvature of micelles and cause shape change.

Micellar Shape Transition: from Spherical to Worm-Like.

Spherical micelles have been observed for solution of 50 mM DM, while worm-like micelles have been found for solution of 50 mM DM and 50 mM phenol using Cryo-TEM technique. The results support the proposal that the micellar shape change due to the presence of phenol. The shape transition has been attributed to the molecular geometries, or the packing parameters. The micellar phase transition from spherical to worm-like causes a viscosity increase and thus decrease the flux of ultrafiltration.

The invention can be illustrated by the following non-limiting examples.

EXAMPLES

Materials

Figure 6:
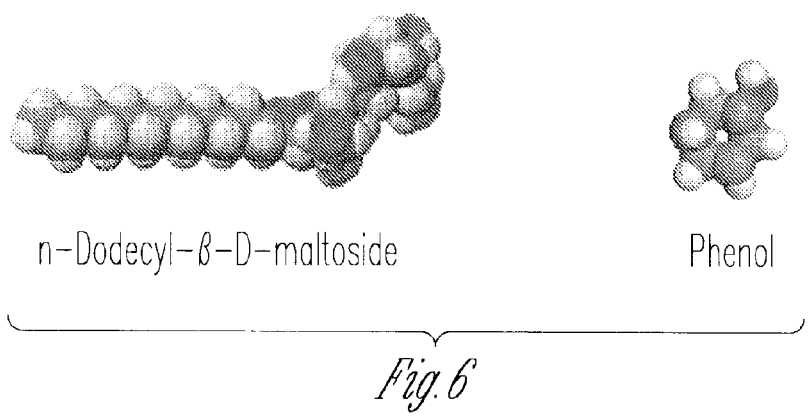
FIG. 6 shows molecular models of dodecyl maltoside and phenol, according to some embodiments of the disclosed subject matter.

Surfactant: n-dodecyl-β-D-maltoside (DM), 98% purity grade, was obtained from Calbio chem and used as received. The critical micellar concentration of DM measured by surface tension experiments is 0.18 mM. Phenol was purchased from Fisher science and used as received. The molecular structures are shown in FIG. 6 respectively. Water used in all the experiments was triple distilled.

Methods:

1) Ultrafiltration

Ultrafiltration was employed to separate surfactant and phenol monomers from surfactant micellar solutions. All ultrafiltration tests were done at room temperature ($23\pm2°$ C.) using Amicon YM-3 membrane specified to exclude molecules with molecular weights greater than 3000 Da (daltons) with a diameter 44.5 mm. The filtration was carried out using an Amicon model 8050 filter at a 380-mmHg nitrogen pressure. Two ml of permeate was filtered from 20 ml sample solution for each test.

2) Chemical Analysis

Concentration of DM in permeate was determined by calorimetric method through phenol-sulfuric acid reaction[27]. Phenol concentration was determined by UV absorbance at 270.0 nm using a Perkin Elmer Lambda UV/VIS Spectrometer.

3) Cryogenic Transmission Electron Microscopy

A thin film of the samples is prepared in the controlled environment vitrification system (CEVS) to control the humidity and temperature. The thin film is cooled rapidly in liquid ethane to form a vitrified sample and then transferred to liquid nitrogen. The cryogenic temperature is below −166° C. The images are recorded on a high-resolution cooled CCD camera at magnifications of up to 50,000

4) 2D NOSY NMR spectroscopy $D_2O$ of 99.9% deuterated hydrogen was purchased from Cambridge Isotope Laboratories Inc and used as received without further purification. All $^1H$ NMR measurements were performed in $D_2O$ solutions on a Bruker DMX-500 NMR spectrometer with a $^1H$ proton frequency of 500.13 MHz at 25° C. Inversion recovery 2D NOESY experiments were conducted with the standard three-pulse sequence.

All publications, patents, and patent applications cited herein are incorporated herein by reference in their entirety. While in the foregoing specification this invention has been described in relation to certain preferred embodiments thereof, and many details have been set forth for purposes of illustration, it will be apparent to those skilled in the art that the invention is susceptible to additional embodiments, combinations and sub-combinations; and that certain of the details described herein may be varied considerably without departing from the basic principles of the invention.

What is claimed is:

1. A process for removal of an at least slightly water-soluble organic compound from an organic-contaminated water solution to provide a purified water solution, comprising:

adding a surfactant to the organic-contaminated water solution in sufficient quantity to achieve at least a critical micellar concentration of the surfactant in the organic-contaminated water solution, wherein the surfactant comprises n-dodecyl-β-D-maltoside, to provide a micellar water solution comprising micelles comprising the surfactant and the organic compound;

contacting an ultrafiltration membrane with the micellar water solution under pressure and temperature conditions sufficient for liquid flow through the ultrafiltration membrane to take place; and collecting liquid permeating the ultrafiltration membrane to provide the purified water solution.

2. The process of claim 1 wherein the organic compound is a phenol.

3. The process of claim 1 wherein the step of contacting the ultrafiltration membrane with the micellar water solution under pressure and temperature conditions sufficient for flow through the ultrafiltration membrane to take place comprises a pressure head of at least about 300 mm Hg at ambient temperature.

4. The process of claim 1 wherein the organic-contaminated water solution is comprised by an industrial wastewater or a contaminated groundwater.

5. The process of claim 1 wherein the ultrafiltration membrane excludes molecules with molecular weights greater than about 3000 Da.

6. The process of claim 1 wherein the micellar water solution has a surfactant concentration of about 5-50 mM.

7. The process of claim 1 wherein the micellar water solution has a surfactant concentration of about 10-40 mM.

8. The process of claim 1 wherein the micellar water solution has a surfactant concentration of about 20-30 mM.

9. A method of using the process of claim 1 to purify industrial wastewater, comprising adding the surfactant to the wastewater to provide a wastewater surfactant dispersion, contacting the wastewater surfactant dispersion with an ultrafiltration membrane under conditions sufficient for liquid flow through the membrane to take place, and collecting purified permeate liquid.

10. A method of using the process of claim 1 to purify contaminated groundwater, comprising adding the surfactant to the groundwater to provide a groundwater surfactant dispersion, contacting the groundwater surfactant dispersion with an ultrafiltration membrane under conditions sufficient for liquid flow through the membrane to take place, and collecting purified permeate liquid.

* * * * *